United States Patent
Dorrel et al.

[19]

[11] Patent Number: 5,847,350
[45] Date of Patent: Dec. 8, 1998

[54] ADJUSTABLE MOUNT

[75] Inventors: Brian D. Dorrel, Batesville, Ind.; Keith B. Alexander, Cincinnati, Ohio; David J. Huff, Cincinnati, Ohio; Wilbur R. Weems, Cincinnati, Ohio

[73] Assignee: General Electric Company, Cincinnati, Ohio

[21] Appl. No.: 876,899

[22] Filed: Jun. 16, 1997

[51] Int. Cl.⁶ .................................. B23H 7/26; B23H 9/10
[52] U.S. Cl. ..................................... 219/69.15; 248/220.22
[58] Field of Search ................ 403/59, 362; 248/220.22; 208/665; 204/297 R, 224 M; 219/69.15, 86.25

[56] References Cited

U.S. PATENT DOCUMENTS

| | | | |
|---|---|---|---|
| 3,125,700 | 3/1964 | Bentley et al. | 204/224 M |
| 3,156,808 | 11/1964 | Davies et al. | 204/224 M |
| 3,357,726 | 12/1967 | Gabrielson | 403/59 |
| 3,939,322 | 2/1976 | Bonga . | |
| 3,963,894 | 6/1976 | Wachtell et al. . | |
| 4,168,419 | 9/1979 | Bonga . | |
| 4,726,104 | 2/1988 | Foster et al. . | |
| 4,786,062 | 11/1988 | Schneider | 403/362 |
| 5,048,183 | 9/1991 | Cang et al. . | |
| 5,158,659 | 10/1992 | Suzuki et al. . | |
| 5,197,361 | 3/1993 | Carrier et al. . | |
| 5,525,001 | 6/1996 | Perkins . | |

FOREIGN PATENT DOCUMENTS

| | | | |
|---|---|---|---|
| 973278 | 11/1982 | U.S.S.R. | 219/69.15 |
| 2248032 | 3/1992 | United Kingdom | 219/69.15 |

*Primary Examiner*—Geoffrey S. Evans
*Attorney, Agent, or Firm*—Andrew C. Hess; David L. Narciso

[57] ABSTRACT

A mounting apparatus including a first element is slideably connected to a second element by a joint. The joint includes first and second spaced apart walls on the first element and a third wall on the second element that is slideably disposed between the first and second walls. A biasing feature, such as a spring, is disposed between the first and second elements. Preferably, a restraining feature is used for restraining slidable movement to one degree of freedom of motion between the elements. A bore is disposed in one wall of one of the elements and is generally alignable with a conical cavity in another wall of another of the elements and a rod disposed through the bore. The rod has a conical tip with a tip conical surface for engaging a cavity conical surface of the conical cavity. The conical tip is smaller than the conical cavity in diameter so as to being able to effect the biasing movement by axial movement of the rod in the bore. The restraining feature further may include a pivoting feature for restraining slidable movement between the elements to pivoting about a pivot point of the pivoting feature and in another embodiment a linear restraining feature may be used for restraining slidable movement between the elements to linear movement. The holder may be used to hold an electrode.

19 Claims, 4 Drawing Sheets

ADJUSTABLE MOUNT

BACKGROUND OF THE INVENTION

1. Field of the Invention

The present invention relates generally to a mounting apparatus incorporating a clevis type joint and a fastening apparatus and, more particularly, to an adjustable joint and to a fastening apparatus such as a clamping apparatus mounted to the joint.

2. Discussion of the Background Art

A clevis, i.e., a U-shaped shackle that has holes drilled in the ends or flanges of the "U" to receive a bolt, is often used in various industries for attaching one part to another. For example, as disclosed in U.S. Pat. No. 5,525,001, parts have been attached to rigid members using clevis fasteners. In these instances, the rigid member has a rigid clevis attached thereto or integral therewith and the part has a mounting projection with a hole drilled therethrough. The mounting projection is inserted between the flanges of the clevis so that the hole in the mounting projection is aligned with the holes in the flanges of the clevis so that a bolt or pin may be passed through the aligned holes. A clevis type of joint for the purposes of this patent includes an element with a single flange or wall slideably disposed between the two flanges or walls of a U-shaped end of another element. Typically, a pivoting pin is disposed in holes in the walls to restrict slidable movement between the two elements to pivoting, but for the purpose of this invention, clevis type joint includes apparatus to restrict relative movement to one degree freedom of movement which includes linear sliding as well as pivoting sliding. Such clevis joints or fasteners are not adjustable and as such are difficult to adjust to various deviations in assemblies incorporating clevis fasteners. Therefore, it is highly desirable to have an adjustable clevis type of joint to accommodate such deviations.

A problem faced by technicians in the airfoil restoration field is that of accurately positioning an electrode having an airfoil shaped cross-section to reform, by electrical discharge machining (EDM), a pocket having substantially the same airfoil shaped cross-section in a squealer tip of turbine blade. It is desirable to EDM several squealer tips at once as is presently done. The pockets in the squealer tips typically have slightly different orientations which may be due to several factors such as untwisting of the blade. Presently, these variations are accommodated by shimming the electrode in a clamping apparatus of an electrode holder. This is a very time consuming process and hence adds cost to the restoration process. Furthermore, it is difficult to do because of the tight spaces that the EDM machine operator must work in to accomplish the shimming and adjusting of the electrode within the clamp.

SUMMARY OF THE INVENTION

The present invention is a mounting apparatus including: a first element slideably connected to a second element by a joint; the joint including first and second spaced apart walls on the first element and a third wall on the second element that is slideably disposed between. the first and second walls; and a biasing feature to effect biasing movement between the first and second elements. A bore is in one wall of one of the elements and is generally alignable with a conical cavity in another wall of another of the elements; and a rod disposed through the bore. The rod has a conical tip with a tip conical surface for engaging a cavity conical surface of the conical cavity.

The conical tip is smaller than the conical cavity in diameter so as to being able to effect the biasing movement by axial movement of the rod in the bore. The apparatus preferably includes a restraining feature for restraining slidable movement to one degree of freedom of motion.

One embodiment of the present invention, the restraining feature further includes a pivoting feature for restraining slidable movement between the elements to pivoting about a pivot point of the pivoting feature. The biasing feature may be a spring curved and disposed between and engaging the elements and the rod may be a threaded bolt disposed in a threaded bore. Another embodiment includes a linear restraining feature for restraining slidable movement between the elements to linear movement and the biasing feature may be one or more straight springs disposed between and engaging the elements.

A more particular embodiment of the present invention is in the form of an electrode holding apparatus for holding an EDM electrode. The apparatus preferably included forward and aft first elements joined by forward and aft connections to forward and aft ends of a second element, respectively. The forward connection is preferably the pivoting type of joint with a pivot for restraining slidable movement between the forward first element and the second element to pivoting about a pivot point of the pivot and the aft connection is preferably a linearly sliding type of joint with linear restraining apparatus for restraining slidable movement between the aft first element and the second element to linear movement. A clamp for holding the electrode is attached to the forward element.

The pivot preferably includes a pin disposed through holes in the first and second spaced apart walls and the third wall of the forward connection and the linear restraining apparatus may include flat walls normal to and extending between the first and second walls of the second element of the aft connection and parallel to and slidingly engaged with side surfaces of the aft end of the first element.

Yet, a more particular embodiment of the present invention is an electrical discharge machining assembly for machining an airfoil shaped recess in a blade tip. The assembly includes a plurality of electrode holders where each electrode holder includes the holder described above with the clamp configured for holding an electrode having an airfoil shaped cross-section and adjusting an orientation and position of the electrode to be substantially aligned with the recess in the blade tip. Aft connections of the holders preferably include rectangular aft ends of a second plurality of multiples of the second element slidingly received in a plurality of slots in a movable electrode bar of the apparatus and where each slot includes the first and second walls of the third element.

ADVANTAGES OF THE INVENTION

The present invention provides several advantages over holders, electrode holders, and EDM apparatus in the prior art. The present invention allows rotational or pivotal and linear adjustment of devices such as EDM electrodes by easily accessible and rotatable knobs and bolts. It provides easy adjustment in areas of machinery which are difficult to access, especially if shims have to be used. It eliminates difficult and time consuming position adjustments of articles such as EDM electrodes with shims. The present invention is easily adaptable to present day machinery and has wide ranging applicability.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
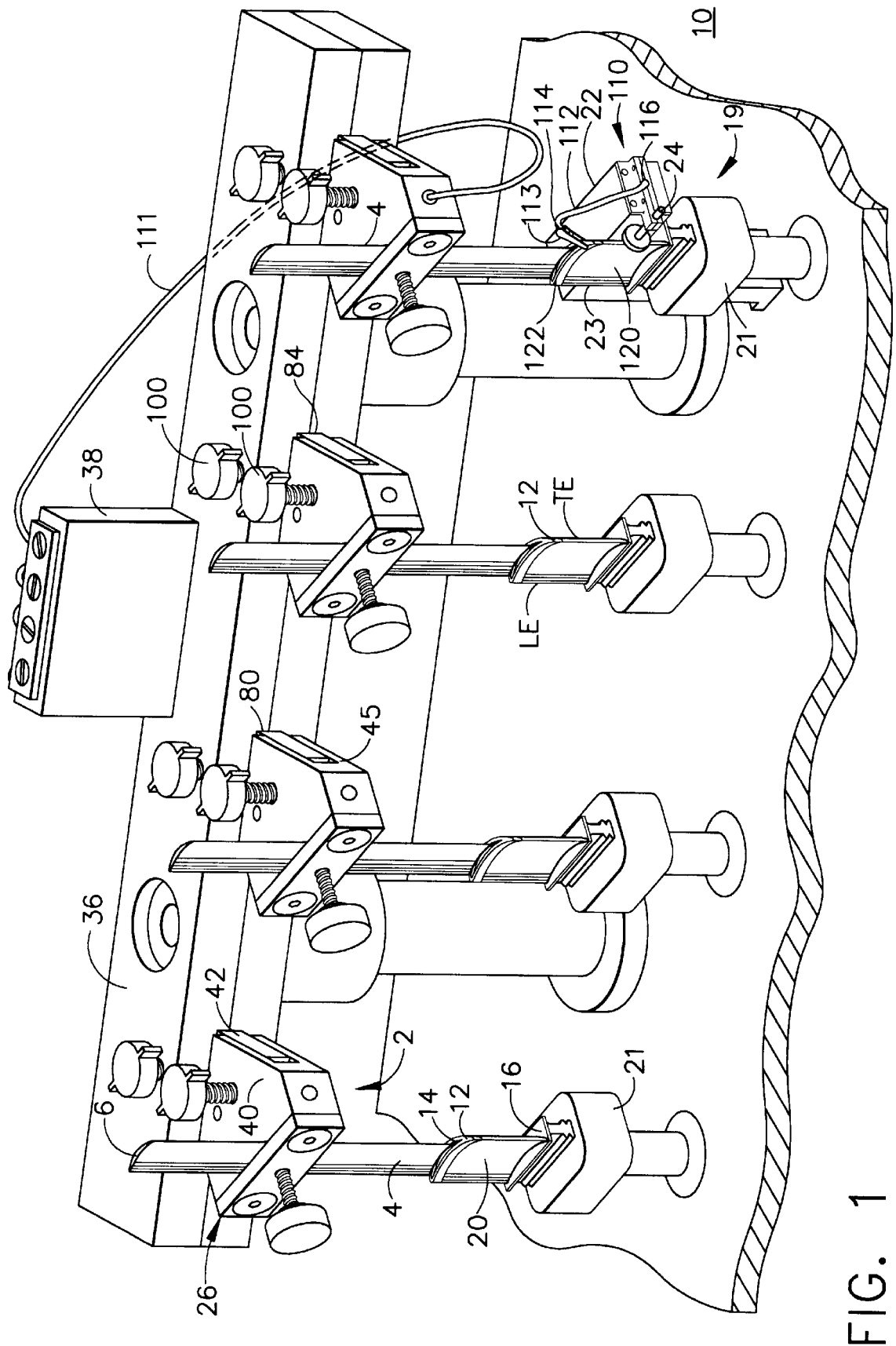
FIG. 1 is a perspective illustration of an EDM assembly for machining an airfoil shaped recess in an airfoil tip of a turbine blade in accordance with an exemplary embodiment of the present invention.

The apparatus of the present invention illustrated in FIG. 1 includes a tool or, more particularly, an electrode holder 2, which exemplifies the present invention, for holding electrodes 4 which have an airfoil cross-section 6, in an EDM machine 10. The EDM machine 10 is illustrated as being used for precision EDM-machining of a rebuilt, refinished, or refurbished squealer tip 12 in recesses 14 of turbine blade 16 and airfoils 20. The blades 16 are held in suitable work-holding means 19 which includes a resilient insulated blade root support 21, a grounding fixture 22 having a curved recess 23 contoured to hold a leading edge LE of the airfoil 20, and a securing clamp 24 mounted on the fixture and designed to press against a trailing edge TE of the airfoil in order to securely hold the airfoil and. blade 16 in place so as to suitably present the recess 14 to the electrode 4. The elongated electrodes 4 have the airfoil shaped cross-sections 6 configured for precision EDM-machining of the correlated recesses 14 which are suppose to have substantially the same airfoil shaped cross-sections 6. The holders 2 are mounted to a bar 36 which is reciprocally mounted in a guided support of a frame 38 of the EDM machine 10.

Though many other uses for the present invention exist, the invention is illustrated for use in reforming the recesses after the squealer tip has been repaired and blade tip material must be removed by EDMing the recess to reform its desired airfoil cross-section. This is a well known technique for refurbishing turbine blade airfoil squealer tips. The difficulty has always been with aligning the electrodes 4 with the recesses 14 of the squealer tip 12 because the airfoils 20 change during operation and especially change their twist along a stacking line of the blade such that the angular orientation of the recess is slightly different from its original design and also different from blade to blade that is being refurbished in the EDM machine. Therefore, usually each electrode 4 must be realigned with the recesses 14 of each new blade that is loaded into the EDM machine 10. Previously, this was done by shimming the electrode 4 mounted in an electrode clamp 26 of the EDM machine.

Figure 2:
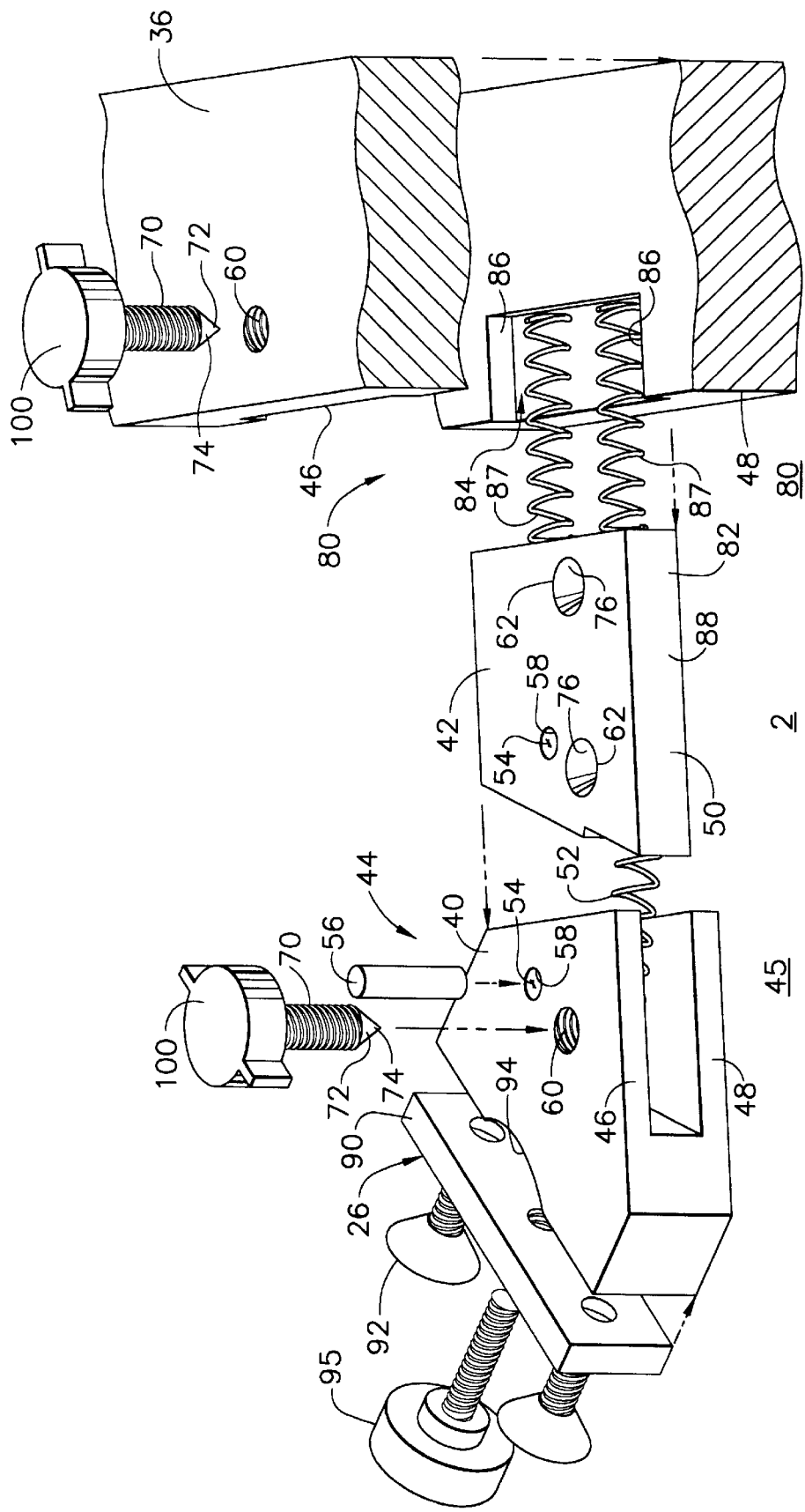
FIG. 2 is an enlarged exploded perspective illustration of a mounting apparatus for holding an EDM electrode in accordance with an exemplary embodiment of the present invention illustrated in FIG. 1.
Figure 3:
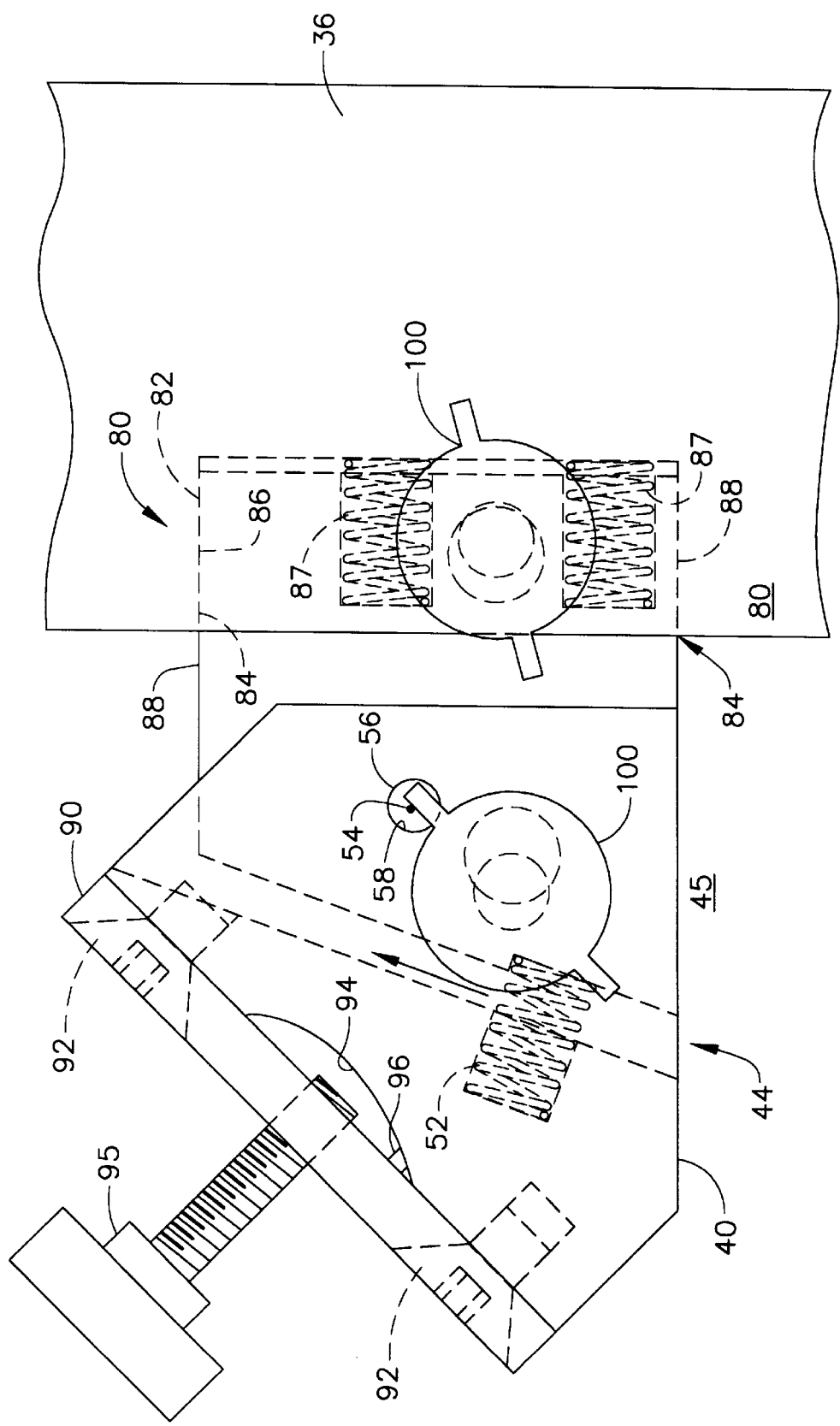
FIG. 3 is a top un-exploded illustration of the, mounting apparatus illustrated in FIG. 2.
Figure 4:
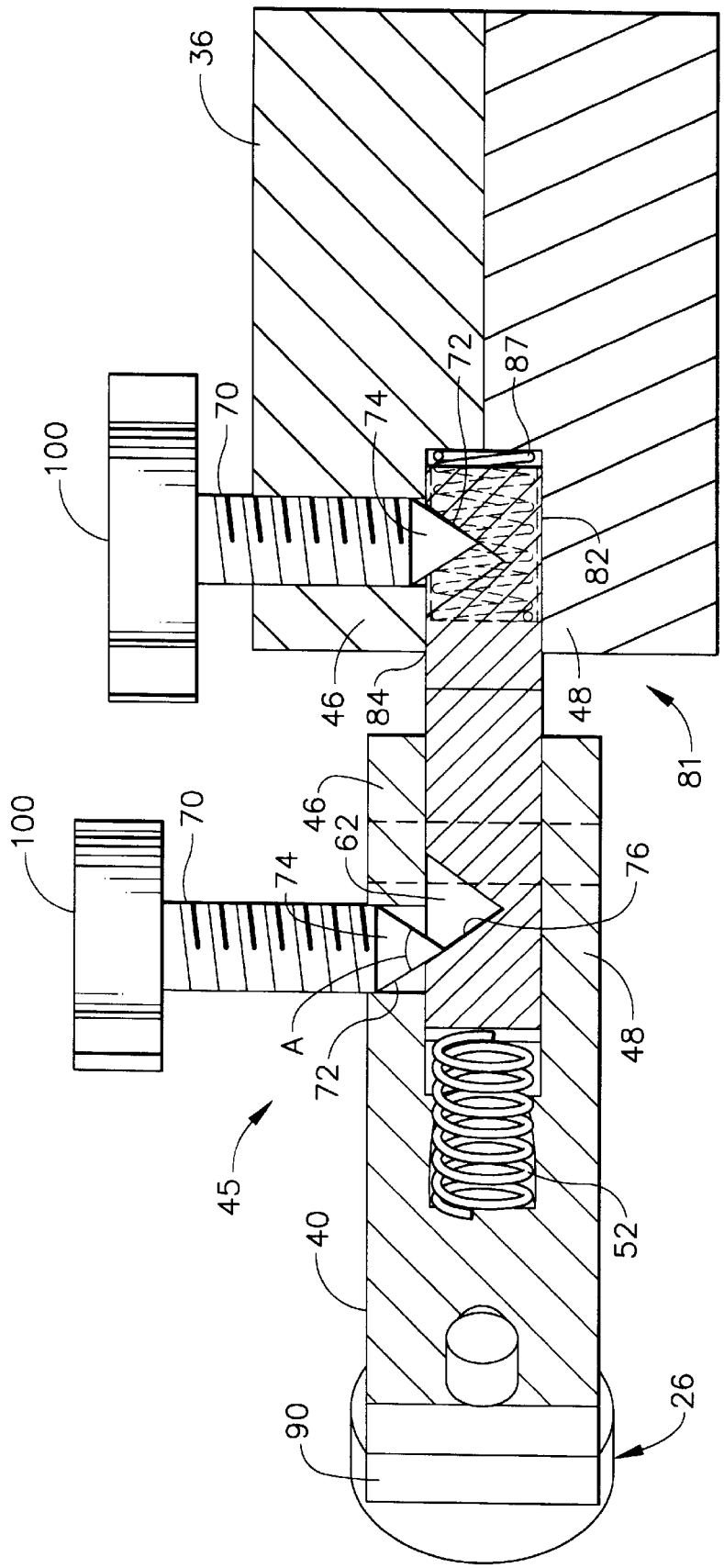
FIG. 4 is a side un-exploded illustration of the mounting apparatus illustrated in FIG. 2.

The present invention eliminates the need for the shimming procedure by providing an adjustable holder 2 which mounts the electrode clamp 26 to the bar 36 of the EDM machine 10. Referring now to FIGS. 2–4, the electrode clamp 26 is fixedly attached to a first element 40 that is slideably connected to a second element 42 by a first slidable joint illustrated as a first or pivotal joint 44 at a forward connection 45 of the holder 2. The pivotal joint 44 includes spaced apart first and second walls 46 and 48, respectively, on the first element and a third wall 50 on the second element that is slideably disposed between the first and second walls.

A biasing means illustrated in the form of a bendable spring 52 to effect biasing movement between the first and second elements 40 and 42, respectively. A restraining means for restraining slidable movement to one degree of freedom of motion is another feature of the present invention and is illustrated in the pivotal joint 44 as a pivoting means for restraining slidable movement between the first element 40 and the second element 42 to pivoting about a pivot point 541 of the pivoting means. This pivot may be a pin 56 disposed through holes 58 in the first, second, and third walls 46, 48, and 50, respectively, of the forward connection 45.

A threaded bore 60 disposed through the first wall 46 is generally alignable with a conical cavity 62 in the third wall 50 of the second element 42. A rod illustrate in a preferred form of a threaded bolt 70 is threadingly disposed through the bore 60 and has a conical tip 72 with a tip conical surface 74 for engaging a cavity conical surface 76 of the conical cavity 62. The conical surfaces 74 and 76 preferably have the same cone angle A to provide maximum contact between the surfaces. The conical tip 72 is smaller than the conical cavity 62 in diameter so as to being able to effect pivoting between the first and second elements, against a biasing force or moment provided by the spring, by axial movement of the bolt 70 in the bore 60 against the biasing force of the spring 52. The pivotal restraining means restrains slidable movement to one degree of freedom of motion, in this embodiment it is pivoting.

Another embodiment of the present invention is a second or linear slidable joint 80 located at an aft connection 81 of the holder 2 which connects the second element 42 to a third element which is the bar 36 of the EDM machine 10. A rectangular aft end 82 of the second element 42 is slidingly received in a slot 84 in the bar 36. Each of the slots 84 in the bar includes the spaced apart first and second walls 46 and 48, respectively, of the third element or bar 36 and the rectangular aft end 82 of the second element 42 is slidingly disposed therebetween. A linear restraining means for restraining slidable movement between the second and third elements to linear movement is formed by flat walls 86 normal to and extending between said first and second walls of the third element or bar. The flat walls 86 are parallel to and slidingly engaged with side surfaces 88 of the aft end 82 of the second element 42. Biasing means may be one or more straight springs 87 (two are illustrated in the FIGS.) disposed between and engaging the second element 42 and the bar 36.

A linear adjustment means is provided by another threaded bore 60 disposed through the first wall 46 of the bar 36 and the generally alignable conical cavity 62 in the third wall 50 at the aft end 82 of the second element 42. Another threaded bolt 70 with the conical tip 72 and the tip conical surface 74 engages another cavity conical surface 76 of the conical cavity 62. This aft adjustment means provides linear movement between the bar 36 and second element 42, against a linear biasing force provided by the straight springs 87 by axial movement of the bolt 70 in the bore 60 against the biasing force of the straight springs.

The electrode clamp 26 includes a removable plate 90 held in place by machine screws 92 threaded into the first element 40. A contoured notch 94 is provided for seating the electrode 4 with a set screw 95, and positioning pins 96 (2 are typically used, the one below in FIG. 3 cannot be seen in this view) help position the electrode in the notch. This embodiment provides easily access to the adjustment means of the holder 2 and a fine degree of adjustment of the attitude or angle of the clamped electrode 4 relative to the recess 14 of the squealer tip 12 in recesses for reforming the recess an EDM process in the EDM machine 10. Both linear and pivotal fine adjustments are provided by the joints at the forward and aft connections of the holder. Furthermore, each of the four electrodes may be individually adjusted to the twist angle of its associated recess. Knobs 100 are used on the bolts 70 to leverage the torquing of the bolts and enhance the fine adjustment characteristics and ease of use of the present invention.

Another feature of the present invention, illustrated in FIG. 1, includes a grounding means 110 (one illustrated) for directly grounding the blade squealer tip 12 during electrical discharge machining. Power lines or cables 111 are also illustrated for supplying electricity to the electrodes 4. Ideally the power cable 111 (one illustrated) should be located as close as possible to the electrode 4. The grounding means is illustrated in its preferred embodiment as a ground cable or wire 112 having a grounding clip 113, attached to a first end of said wire 114 which is grounded at a second end of the wire 116, preferably to the grounding fixture 22. Alligator clips are preferred for the grounding clip 113, though any suitable means for making sufficient electrical contact to ground the blade squealer tip 12 may be used. This feature provides the advantage of being able to us the EDM process with airfoils 20 that have thermal barrier coatings 120 on their surface and refurbished or reconstructed squealer tips 12 that are not so coated and have bare metal 122 exposed. In such a case the airfoil has no better than a poorly electrical conducting surface and a suitable electrically conductive blade tip for EDMing. The grounding clip 113 is clipped to the un-coated squealer tip 12 which has excellent electrical conductive properties. This assembly is very useful for refurbishing blades with a thermal barrier coating on the airfoil surface which provides a poorly electrical conducting surface at best and may even be electrically insulating and for which blade tip was replaced or rebuilt.

While the preferred embodiment of the present invention has been described fully, in order to explain its principles, it is understood that various modifications or alterations may be made to the preferred embodiment without departing from the scope of the invention as set forth in the appended claims.

What is claimed is:

1. A mounting apparatus comprising:

a first element slideably connected to a second element by a joint;

said joint including first and second spaced apart walls on said first element and a third wall on said second element, said third wall slideably disposed between said first and second walls;

a biasing means to effect biasing movement between said first and second elements;

a bore in one wall of one of said elements generally alignable with a conical cavity in another wall of another of said elements;

a rod disposed through said bore and having a conical tip with a tip conical surface for engaging a cavity conical surface of said conical cavity; and said conical tip being smaller than said conical cavity in diameter so as to being able to effect the biasing movement by axial movement of said rod in said bore.

2. An apparatus as claimed in claim 1 further comprising restraining means for restraining slidable movement to one degree of freedom of motion.

3. An apparatus as claimed in claim 2 wherein said restraining means further comprises a pivoting means for restraining slidable movement between said elements to pivoting about a pivot point of said pivoting means.

4. An apparatus as claimed in claim 3 wherein said biasing means is a spring disposed between and engaging said elements.

5. An apparatus as claimed in claim 4 wherein said rod is a threaded bolt and said bore is threaded.

6. An apparatus as claimed in claim 2 further comprising a linear restraining means for restraining slidable movement between said elements to linear movement.

7. An apparatus as claimed in claim 6 wherein said biasing means is a spring disposed between and engaging said elements.

8. An electrode holding apparatus for holding an electrode, said apparatus comprising;

a first element slideably connected to a forward end of a second element by a forward connection;

said forward connection including first and second spaced apart walls on said first element and a third wall on said second element, said third wall slideably disposed between said first and second walls;

a biasing means to effect biasing movement between said first and second elements;

a threaded bore in a top one of said first and second walls generally alignable with a conical cavity extending in to said third wall from a top surface in said third wall;

a threaded bolt threadingly disposed through said bore and having a conical tip with a tip conical surface for engaging a cavity conical surface of said conical cavity;

said conical tip being smaller than said conical cavity in diameter so as to being able to effect the biasing movement by axial movement of said rod in said bore; and a clamping means for holding the electrode and attached to one of said elements.

9. An apparatus as claimed in claim 8 further comprising a pivoting means for restraining slidable movement between said elements to pivoting about a pivot point of said pivoting means.

10. An apparatus as claimed in claim 8 further comprising: a third element joined by an aft connection to an aft end of said second element, said forward connection including a pivoting joint with a pivoting means for restraining slidable movement between said forward first element and said second element to pivoting about a pivot point of said pivoting means; and said aft connection being a linearly sliding joint with a linear restraining means for restraining slidable movement between said third element and said second element to linear movement.

11. An apparatus as claimed in claim 10 wherein said clamping means is attached to said first element.

12. An apparatus as claimed in claim 11 wherein:

said pivoting means comprises a pin disposed through holes in said first and second spaced apart walls and said third wall of said forward connection, said linear restraining means comprises flat walls normal to and extending between said first and second walls of said second element of said aft connection, and said flat walls parallel to and slidingly engaged with side surfaces of said aft end of said first element.

13. An electrical discharge machining assembly for machining a blade having an airfoil shaped recess in a blade tip, said assembly comprising:

an electrode holder for holding an electrode having an airfoil shaped cross-section and adjusting an orientation and position of said electrode to be substantially aligned with the recess in the blade tip;

said holder comprising;

a first element slideably connected to a forward end of a second element by a forward connection, said forward connection including first and second spaced apart walls on said first element and a third wall on said second element, said third wall slideably disposed between said first and second walls, a biasing means to effect biasing movement between said first and second elements, a threaded bore in a top one of said first and second walls generally alignable with a conical cavity extending in to said third wall from a top surface in said third wall, a threaded bolt threadingly disposed through said bore and having a conical tip with a tip conical surface for engaging a cavity conical surface of said conical cavity, said conical tip being smaller than said conical cavity in diameter so as to being able to effect the biasing movement by axial movement of said rod in said bore, a clamping means for holding the electrode and attached to one of said elements; and a fixture to mount and hold the blade and present it to said electrode.

14. An assembly as claimed in claim 13 wherein said holder further comprises:

a third element join by an aft connection to an aft end of said second element, said forward connection including a pivoting joint with a pivoting means for restraining slidable movement between said forward first element and said second element to pivoting about a pivot point of said pivoting means; and said aft connection being a linearly sliding joint with a linear restraining means for restraining slidable movement between said third element and said second element to linear movement.

15. An assembly as claimed in claim 14 further comprising:

a first plurality of multiples of said electrode holder, said electrode, and said blades, said plurality of electrode holders having aft connections with rectangular aft ends of a second plurality of multiples of said second element slidingly received between a third plurality of multiples of said first and second walls of a plurality of multiples of said third element, said third plurality bounding rectangular slots in a movable electrode bar of the apparatus.

16. An assembly as claimed in claim 14 further comprising a grounding means for directly grounding the blade tip during electrical discharge machining.

17. An assembly as claimed in claim 16 wherein said grounding means further comprises:

a ground wire having a grounding clip attached to a first end of said wire, said wire grounded at a second end of said wire, and said grounding clip suitable for making sufficient electrical contact to ground the blade tip.

18. An assembly as claimed in claim 17 wherein the blade has an airfoil with no better than a poorly electrically conducting surface and a suitable electrically conductive blade tip and said grounding clip is clipped to said blade tip.

19. An assembly as claimed in claim 18 wherein said surface has a thermal barrier coating on said airfoil except for said blade tip.

* * * * *